F. CONRAD.
VOLTAGE REGULATOR.
APPLICATION FILED JAN. 5, 1907.
923,627.
Patented June 1, 1909.
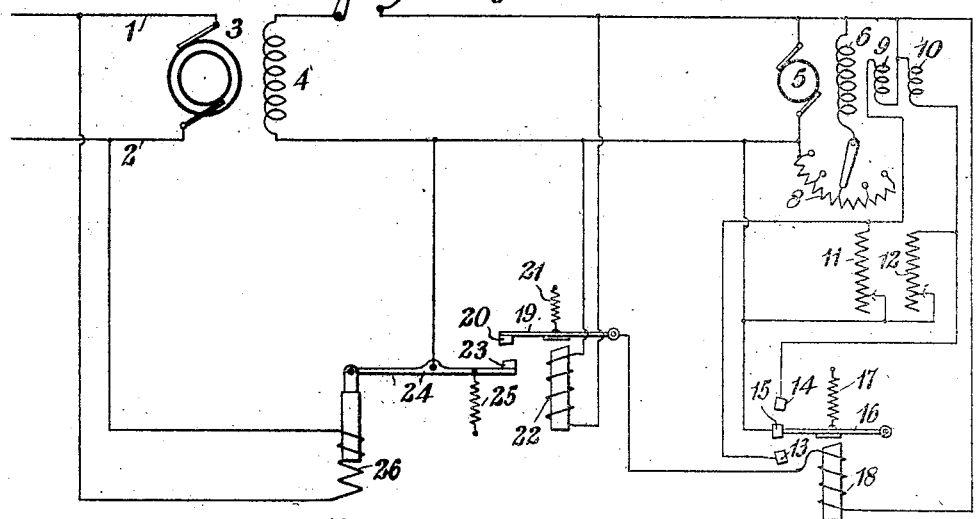
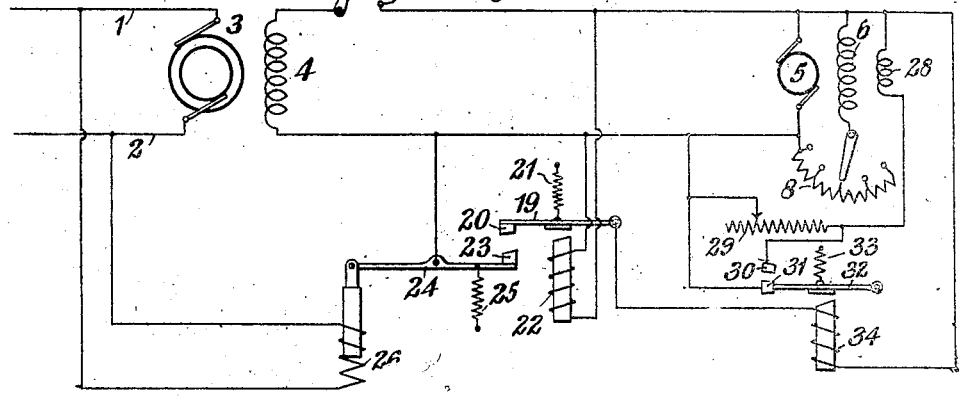
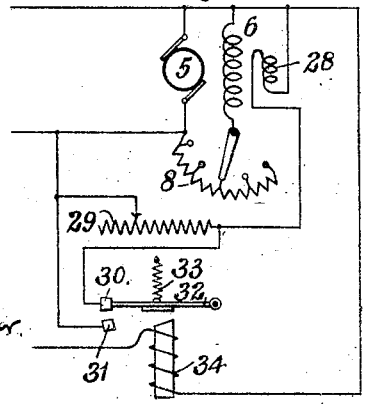
WITNESSES:
C. L. Belcher
Otto S. Schauer
INVENTOR
Frank Conrad
BY
ATTORNEYS

UNITED STATES PATENT OFFICE.

FRANK CONRAD, OF SWISSVALE, PENNSYLVANIA, ASSIGNOR TO WESTINGHOUSE ELECTRIC & MANUFACTURING COMPANY, A CORPORATION OF PENNSYLVANIA.

VOLTAGE-REGULATOR.

No. 923,627.  Specification of Letters Patent.  Patented June 1, 1909.

Application filed January 5, 1907. Serial No. 350,969.

*To all whom it may concern:*

Be it known that I, FRANK CONRAD, a citizen of the United States, and a resident of Swissvale, in the county of Allegheny and State of Pennsylvania, have invented a new and useful Improvement in Voltage-Regulators, of which the following is a specification.

My invention relates to regulators that are adapted to be employed in connection with electrical generators for causing the same to supply constant voltages to distributing circuits, and particularly to those that effect voltage regulation by adjusting the field strengths of the exciters for the generators.

The object of my invention is to provide a regulator of the character indicated that shall be more effective in operation and more readily applicable to the adjustment of the field strengths of large exciters than others heretofore employed.

Figure 1 of the accompanying drawing is a diagrammatic view of a system that embodies my invention. Fig. 2 is a similar view of a modification of the system shown in Fig. 1, and Fig. 3 is a diagram of a portion of a system embodying still another modification of the invention.

An electrical circuit that comprises conductors 1 and 2, the voltage of which it is desired to maintain substantially constant, is supplied from a generator 3, here indicated as adapted to supply alternating current, but replaceable, if desired, by a generator adapted to supply direct current. The generator 3 is provided with a field magnet winding 4 that may be energized by an exciter generator having an armature 5 and a main field magnet winding 6 that is connected across the terminals of the armature 5, rheostats 7 and 8 being placed in circuit with the respective field magnet windings 4 and 6 for manually adjusting the amounts of current that traverse the said windings. In the system shown in Fig. 1, the exciter generator is also provided with two auxiliary field magnet windings 9 and 10 that are connected, respectively, in series with resistances 11 and 12, across the terminals of the armature 5 of the exciter. The windings 9 and 10 preferably comprise equal numbers of ampere turns that are less than the ampere turns of the main field magnet winding 6, and they are so connected in the circuit that the magnetizations caused thereby oppose and neutralize each other, and, consequently, one of the windings (10) acts in conjunction with the main winding 6, while the other (9) acts in opposition to it. In practice, the field strength of the main winding 6 will ordinarily be so adjusted that, under the most usual conditions of operation, it will provide just the proper excitation for the exciter generator.

The resistances 11 and 12 that are in circuit with the auxiliary field magnet windings 9 and 10 may be short-circuited by means of a device comprising stationary contact terminals 13 and 14, that are connected, respectively, to terminals of the field magnet windings 9 and 10, and a movable contact terminal 15 that is connected to one terminal of the armature 5 and is adapted to be vibrated between, and into and out of engagement with, the stationary terminals 13 and 14, by means of a lever 16. The lever 16 may be moved to its uppermost position, in order to effect engagement of the contact terminals 14 and 15, by means of a spring 17, and downwardly against the tension of the spring 17, in order to effect engagement of the contact terminals 13 and 15, by means of a magnet having a winding 18 one terminal of which is connected to one terminal of the armature 5 and the other terminal of which is connected to a lever 19 that is provided with a contact terminal 20. The lever 19 may be moved downwardly, against the tension of a spring 21, by means of a magnet having a winding 22 that is connected across the terminals of the armature 5, the operation of the lever 19 being, in this manner, caused to depend upon the voltage of the exciter generator. The circuit of magnet winding 18 is adapted to be controlled by the movement of the contact terminal 20 into and out of engagement with another contact terminal 23 upon a lever 24 to which one terminal of the armature 5 is connected. The position of the contact terminal 23 depends upon the relation of the forces that are exerted upon opposite ends of the lever by means of a spring 25 and a magnet having a winding 26 that is connected across the main circuit conductors 1 and 2, the intensity of the magnetization exerted by the winding 26 depending upon the voltage of the main circuit.

As has been pointed out, the main field magnet winding 6 of the exciter generator affords just the proper excitation therefor under the most usual conditions, as regards the load upon the main circuit 1—2 and, consequently, the average excitation afforded by the windings 9 and 10 should be zero. This result is secured, in the present instance, by causing the contact terminal 15 to be vibrated between the contact terminals 13 and 14 so as to make engagement alternately therewith for equal periods of time, the magnetizing effects of the windings 9 and 10 being in this manner caused to predominate over each other alternately. In order to better understand the manner in which the contact terminal 15 is vibrated into and out of engagement with the contact terminals 13 and 14, let it be supposed that the contact terminals 20 and 23 are in close proximity, but out of engagement. Since the circuit of the magnet winding 18 is interrupted, the spring 17 will move the contact terminal 15 into engagement with stationary terminal 14. The resistance 12 will then be short-circuited and the auxiliary field magnet winding 10 will be more strongly energized than the winding 9 and will supplement the magnetization afforded by the main field magnet winding 6. The exciter will then impress a higher voltage upon the field magnet winding 4 of the generator 3 and thus cause a corresponding increase in the voltage of the circuit 1—2. The increase of the exciter voltage causes the magnet winding 22 to be more strongly energized and the contact terminal 20 will be moved into engagement with the terminal 23. At the same time, the increase in the voltage of the circuit 1—2 may also cause a stronger energization of the winding 26, and the contact terminal 23 may thus be moved upwardly a slight amount to assist in effecting engagement of the contact terminals 20 and 23.

The circuit of the magnet winding 18 is established by the engagement of the contact terminals 20 and 23 and the contact terminal 15 is thereupon moved downward into engagement with the stationary terminal 13. The resistance 11 is in this manner short-circuited, and the auxiliary field magnet winding 9 predominates in its magnetization over that of the winding 10 and detracts from the excitation afforded by the main field magnet winding 6. The voltage applied to the field magnet winding 4 of the main generator by the exciter is thus reduced and a slight reduction in the voltage of the circuit 1—2 follows. The reduction in the exciter voltage causes a corresponding reduction in the magnetization of the winding 22 and the spring 21 effects disengagement of the contact terminals 20 and 23. At the same time the reduction in the voltage of the circuit 1—2 may also cause a corresponding reduction in the magnetization of the windings 26, and the spring 25 may assist in effecting disengagement of the contact terminals 20 and 23.

If the voltage of the circuit 1—2 is decreased as, for instance, by a heavy load, the magnetization of the winding 26 will be reduced and the contact terminal 23 will be lowered by the action of the spring 25. Then, since the contact terminal 20 is required to move through a greater distance than previously in order to engage the contact terminal 23, the contact terminal 15 will remain in engagement with the stationary terminal 14 for longer periods of time than with the stationary terminal 13 and, consequently, the periods during which the magnetization of the auxiliary magnet winding 10 will predominate over that of the winding 9 will be longer than those during which the magnetization of the winding 9 will predominate over that of the winding 10. An increase in the field strength of the exciter generator is thus effected which causes a corresponding increase in the voltage applied to the field magnet winding 4 of the generator 3. The generator will thus be caused to increase the voltage of the circuit 1—2 to its normal value. If the voltage of the circuit 1—2 increases, the contact terminal 23 will be raised correspondingly, because of the increased magnetization of the winding 26, and the contact terminal 20 will then be required to move a shorter distance in order to engage the contact terminal 23. The result is, as will be understood from the foregoing description, that the field excitation of the exciter generator, and also that of the main generator 3 will be increased, and a corresponding decrease in the voltage of the circuit 1—2 will be thereby effected.

In the system shown in Fig. 2, only a single auxiliary field magnet winding 28 is provided for the exciter generator, the said winding being preferably arranged to act in conjunction with the main winding 6, the magnetization afforded by which will be somewhat less than is required for normal operation. If desired, however, the auxiliary winding may be arranged to act in opposition to the main winding, as indicated in Fig. 3, and the latter may afford a greater field magnetization than is necessary for normal operation. A resistance 29, that is connected in series with the auxiliary winding 28, is shunted when the voltage of the circuit 1—2 rises above a predetermined value, by means of a device comprising coöperating stationary and movable contact terminals 30 and 31, respectively. The latter terminal is carried by a pivoted arm 32 that is operated against the tension of a spring 33 by means of an electro-magnet having a winding 34, the circuit of which is governed by the devices comprising levers 19 and 24, said levers being respectively responsive, in operation, to the voltages of the exciter and main circuits. Thus, if the auxiliary winding 28 acts in conjunction with the main winding 6, and the voltage of the circuit 1—2 increases, the contact terminal 23 will be raised into engagement with the terminal 20, thereby completing the circuit of the winding 34. The contact terminals 30 and 31 will then be separated to open the circuit in shu t to the resistance 29, in this manner causing a diminution of the field magnetization afforded by the auxiliary winding 28 and a corresponding decrease in the voltage of the exciter circuit. This, in turn, causes a weakening of the field of the generator 3 and a decrease in the voltage of the circuit 1—2, this voltage being maintained substantially constant in a manner which will be readily understood from the foregoing description.

If the auxiliary winding 28 acts in opposition to the main winding 6 (see Fig. 3), the contact terminals 30 and 31 should be caused to engage when the voltage of the circuit 1—2 increases, in order to shunt the resistance 29 and cause a decrease in the field strength of the exciter with a corresponding decrease in the field strength and voltage of the generator 3.

It follows that the invention provides means for maintaining a substantially constant voltage in a circuit supplied by a dynamo-electric generator notwithstanding load variations or other disturbing conditions, and also that it is particularly applicable to systems in which large exciter generators are employed, since the circuit controlling devices are traversed only by the same amounts of current as traverse the auxiliary field magnet windings of the exciter generator, which will ordinarily be small in amount as compared with that which traverses the main field magnet winding.

In another application, Serial No. 325,291, filed by me July 9, 1906, I have described means for maintaining a substantially constant voltage in a circuit supplied from any suitable main source and a storage battery, the operation of which is similar to that of the invention which forms the subject-matter of the present application.

I claim as my invention:

1. The combination with an electrical circuit, and a dynamo-electric machine connected thereto, of an exciter generator having a main field magnet winding and two auxiliary field magnet windings arranged to act in opposition, resistances in circuit with the respective auxiliary field magnet windings and means responsive in operation to variations in the voltage of said circuit for shunting the one or the other of the resistances.

2. The combination with an electrical circuit, and a dynamo-electric machine connected thereto, of an exciter generator having a main field magnet winding and two auxiliary field magnet windings arranged to act in opposition, resistances in circuit with the respective auxiliary field magnet windings and means responsive in operation to variations in the voltages of said circuit and the exciter circuit for shunting the one or the other of the resistances.

3. The combination with an electrical circuit, and a dynamo-electric machine connected thereto, of an exciter generator having a main field magnet winding and two auxiliary field magnet windings arranged to act in opposition, resistances in circuit with the respective auxiliary field magnet windings, and means for shunting the one or the other of the resistances comprising co-acting contact terminals that are responsive in operation, respectively, to variations in the voltages of the said circuit and the exciter circuit.

4. The combination with an electrical circuit, and a dynamo-electric machine connected thereto, of an exciter generator having a main field magnet winding and two auxiliary field magnet windings arranged to act in opposition, and means for causing the one or the other of the auxiliary windings to act in conjunction with, or in opposition to, the main winding.

5. The combination with an electrical circuit, and a dynamo-electric machine connected thereto, of an exciter generator having a main field magnet winding and two auxiliary field magnet windings arranged to act in opposition, and means for causing the one or the other of the auxiliary windings to act in conjunction with, or in opposition to, the main winding, the said means being responsive in operation to variations in the voltages of said circuit and the exciter circuit.

6. The combination with an electrical circuit, and a dynamo-electric machine connected thereto, of an exciter generator having a main field magnet winding and two auxiliary field magnet windings connected to act, respectively, in conjunction with, and in opposition to, the main winding, and control switches governed by the main circuit and the exciter circuit voltages to vary the resistance of the circuit of the one or the other auxiliary field magnet winding.

7. The combination with a dynamo-electric machine, and an exciter for its field magnet having a main field magnet winding and two auxiliary field magnet windings that oppose each other, of a plurality of interdependent control switches that are governed by the main and exciter voltages to vary the resistance of the circuit of the one or the other auxiliary field magnet winding.

8. The combination with a main electrical circuit, and a dynamo-electric machine connected thereto, of an exciter generator having field magnet windings arranged to act in opposition, and means responsive in operation to the voltages of the main and exciter circuits to adjust the magnetizing effects afforded by the auxiliary field magnet windings.

9. The combination with a main electrical circuit, and a dynamo-electric machine connected thereto, of an exciter generator having field magnet windings arranged to act in opposition, resistances in the circuits of the field magnet windings, and means responsive in operation to the voltages of the main and exciter circuits for shunting the resistances.

10. The combination with a main electrical circuit, and a dynamo-electric machine connected thereto, of an exciter generator having field magnet windings arranged to act in opposition, and means for adjusting the resistances of the circuits of the field magnet windings, the said means being responsive in operation to the voltages of the main and exciter circuits.

11. The combination with a main electrical circuit, and a dynamo-electric machine connected thereto, of an exciter generator having field magnet windings arranged to act in opposition, and means for adjusting the resistances of the circuits of the field magnet windings so as to maintain the voltage of the main circuit substantially constant.

12. The combination with a main electrical circuit, and a dynamo-electric machine connected thereto, of an exciter generator having field magnet windings arranged to act in opposition, and means for adjusting the resistances of the circuits of the field magnet windings, the said means being responsive in operation to the voltage of the main circuit.

13. The combination with a main electrical circuit, and a dynamo-electric machine connected thereto, of an exciter generator having field magnet windings arranged to act in opposition, and means for adjusting the resistances of the circuits of the field magnet windings, the said means being responsive in operation to the voltage of the exciter circuit.

In testimony whereof, I have hereunto subscribed my name this 29th day of December, 1906.

FRANK CONRAD.

Witnesses:
OTTO S. SCHAIRER,
BIRNEY HINES.